Jan. 17, 1967   H. CHELNER ET AL   3,298,233
PROBE TRANSDUCER
Filed Oct. 2, 1963

INVENTORS
HERBERT CHELNER
BY RUSSELL R. DOUBLEDAY

ATTORNEY

United States Patent Office 3,298,233
Patented Jan. 17, 1967

3,298,233
PROBE TRANSDUCER
Herbert Chelner, Reseda, and Russell R. Doubleday, Newhall, Calif., assignors to North American Aviation, Inc.
Filed Oct. 2, 1963, Ser. No. 313,276
2 Claims. (Cl. 73—398)

This invention relates to transducers.

More particularly, this invention relates to a semi-conductor type transducer which is temperature compensated. The transducer is a probe type sensor for making pressure measurements, for example, in such environments as rocket engine thrust chambers.

There are many applications in the art wherein it is desirable to measure fluid pressure. Many approaches have been made and include diaphragms exposed to pressure which will actuate electrical control means to indicate the pressure on one side of the diaphragm. In recent years, the use of strain gages on a stressed element have been used and typically include a Wheatstone bridge arrangement whereby an output voltage from the bridge is a measure of the strain induced in the transducer elements. This, then, can be correlated with the force or pressure to be measured. It is also desirable in the measurement of fluid pressure that a compact unit be provided so as not to interfere with fluid flow and also that many of these units can be installed in the wall of a rocket engine; for example, so that a more complete picture of pressure at the rocket wall can be ascertained. It is also necessary, particularly with hot gases, that the transducer element be able to resist corrosion, erosion, extreme temperatures and high pressures. The units should be accurate and able to retain their accuracy regardless of temperature variations. It is to such a device that this invention is directed.

According to this invention, a transducer probe is provided which is adapted to fit through the wall of a rocket chamber or the like and is small in size, accurate and is a temperature compensating probe type sensor which is resistant to erosion and corrosion. The sensor includes a long probe which is subject to compressive stress. This compressive stress is transmitted to a thinner member, preferably machined from the same block of metal, which has on it a series of semi-conductive strain gages oriented so as to translate the compressive stresses into electrical readings and to provide automatic compensation for lateral bending.

An object of this invention is to provide an improved transducer.

Other objects and advantages of this invention will become apparent as this description proceeds taken in conjunction with the drawings in which.

Figure 1:
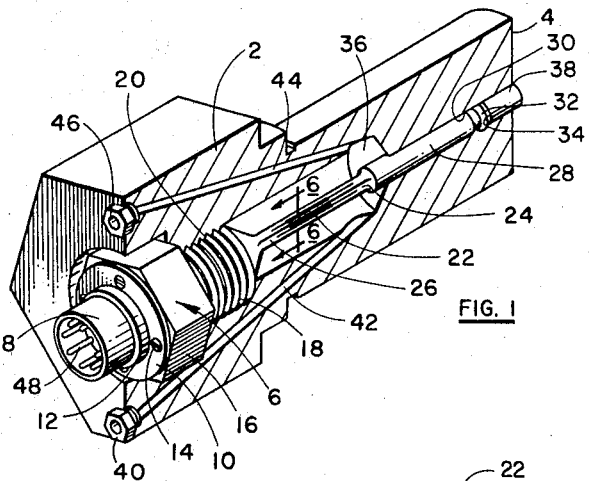
FIG. 1 is a perspective view, partially in cross-section of a pressure transducer assembly according to this invention.
Figure 6:
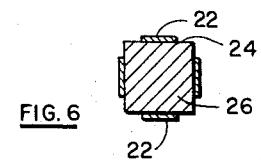
FIG. 6 is a view of a portion of the probe as viewed along the line 6—6 of FIG. 1.

Referring to FIG. 1, there is shown a pressure transducer according to this invention installed in the wall of a thrust chamber forming part of a rocket engine. The thrust chamber wall is designated generally as 2 with the hot gases in the thrust chamber impinging on surface 4 of thrust chamber wall 2. Designated generally as 6 is the transducer element according to this invention. The electrical connector of the transducer is shown generally at 8 and is attached to electrical connector flange 10 through collar 12. Securing screws 14 are provided for securing the flange to the nut member 16. The transducer assembly includes screw threads 18 for threading into complementary threads 20 in rocket wall 2. Shown generally at 22 are the strain gage elements. These elements are mounted on flat machined surfaces 24 (see FIG. 6) on longitudinal shaft 26 by such means as bonding. Longitudinal shaft 26 is shown as being integral with screw threads 18. On the outer end of the shaft 26 is a widened portion 28 which is adapted to fit closely within aperture 30 of rocket wall 2. An O ring is shown at 32 which fits within groove 34 of shaft 26 and acts as a seal to prevent high pressure fluid in the combustion chamber from traversing past the O ring into chamber 36. Preferably, the O ring is located midway of chamber 36 and wall 4. Shown at 38 is an erodable probe tip which is removable from the shaft 26. If desired, this probe tip may be made as an integral part of the shaft 26 and can be welded, bonded, soldered or amalgamated to the probe body as desired although it is preferable that the probe tip be removable. This may be accomplished by screwing the tip 38 on portion 28 of shaft 26. The outer end of portion 38 is mounted flush with surface 4. An inlet coolant port 40 is provided for the introduction of cooling fluid which passes through openings 42 in body 2 into cavity 36. A return line 44 is provided through which the fluid traverses, exiting out exhaust coolant port 46. Thus, any heat transfer from the hot combustion side of the thrust chamberwall 2 into the cavity 38 is absorbed by the cooling fluid. While shown as being cooled, it is within the scope of this invention to utilize other cooling methods or to eliminate cooling entirely.

In operation, the assembly 6 is screwed in one piece into the thrust chamber wall 2 so that the probe end 38 is flush with wall 4 of combustion chamber wall 2. When it is desired to measure the pressure in the thrust chamber, this pressure will be exerted on the end of probe tip 38 which will place the shaft 26 in compression. This compression, in turn, creates a strain in shaft 26 which is transferred to the strain gage elements 22. When strain gage elements 2 are strained, their electrical resistance is changed resulting in a voltage readout (see FIG. 2). Both the power input to the transducer assembly and the voltage readout are transferred through the prongs 48 of electrical connector 8. Preferably, the probe end 38 is made of a non-metal such as Micarta. An ablative probe end offers certain advantages when used in a rocket engine having an ablative chamber. It erodes at approximately the same rate as the chamber wall. When the transducer is mounted so that the probe end is flush with the inside chamber wall, it presents a continuously smooth surface eliminating the tendency to develop hot spots and holes. Also, the Micarta has poor heat transfer qualities, an aid in keeping the sensor portion of the transducer cool. When the tip has eroded to the point where the O ring seal 32 is about to be exposed, the transducer assembly can be removed and another erodable tip placed on the end of shaft 26. An advantage of the portion 28 being larger than the remainder of shaft 26 resides in allowing any pressure exerted on the end of tube 28 by tip 38 transferred to the thinner portion of shaft 26 so that the thinner portion experiences a greater strain due to its smaller area. This, in turn, creates a magnifying factor in the straining of the strain gages 22 and constitutes an important feature of this invention. By being flat, surfaces 24 present optimum surfaces for the bonding of the strain gages.

Figure 2:
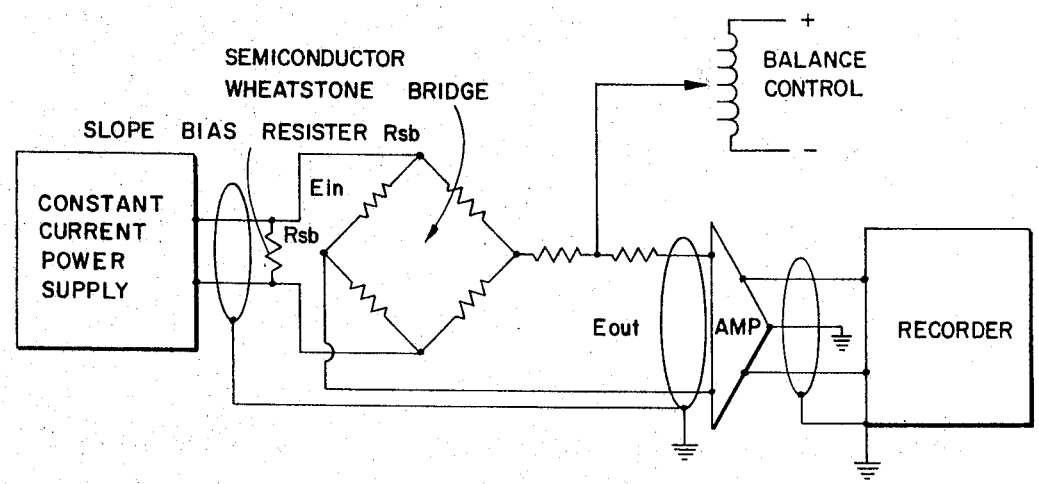
FIG. 2 is a block diagram illustrating the electrical components employed in the invention.

Shown in FIG. 2 is a block diagram of the transducer assembly electronics. There is shown a D.C. power source which, for reasons to be explained later, may be a constant current power supply. This applies the input voltage to the semi-conductor Wheatstone bridge assembly. The voltage readout from strains induced in the assembly is amplified through the amplifier, the output of which is sent to the recorder. A balance control is provided, but does not constitute an important feature of this invention. With the exception of providing a constant current power supply and the slope bias resistor, this is a conventional strain gage circuit. The reason for the constant current power supply and the provision of a slope bias resistor across the terminals of the constant current power supply will become apparent as this description proceeds when taken in conjunction with FIGS. 3, 4 and 5.

Figure 3:
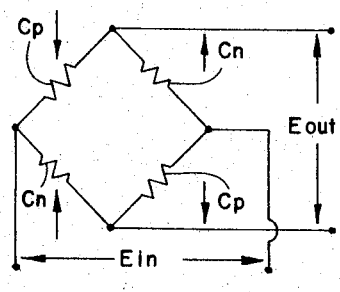
FIG. 3 is a bridge configuration according to one embodiment of this invention.
Figure 4:
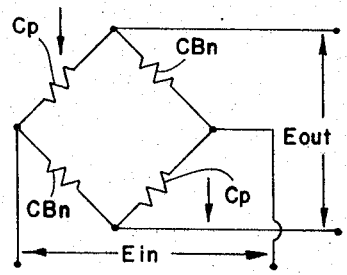
FIG. 4 is a bridge configuration according to another embodiment of this invention.
Figure 5:
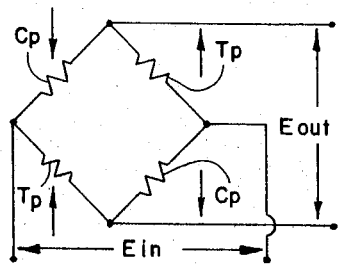
FIG. 5 is a bridge configuration according to still another embodiment of this invention.

Shown in FIG. 3, FIG. 4 and FIG. 5 are three bridge configurations usable with the semi-conductor probe transducer of this invention. These figures and the following discussion are made with reference to the following nomenclature.

Legend $R$ = gage resistance, ohms
$\Delta R$ = change in gage resistance, ohms
$L$ = active length of gage, inches
$\Delta L$ = change in active length of gage, inches
$GF$ = gage factor
$E$ = electromotive force, volts
$p$ = p-doped piezorestive strain gage
$n$ = n-doped piezorestive strain gage
$\uparrow$ = increasing resistance ($+\Delta R$)
$\downarrow$ = decreasing resistance ($-\Delta R$)
$C$ = compression
$T$ = tension
$B$ = temperature compensating element low strain sensitivity Since this probe is utilized in high temperature applications, it is necessary that there be a temperature compensation and bridge balance compensation since with the use of piezo-resistive or semi-conductive elements, the resistive character of each element varies with temperature and with stress induced strain in the mounting member. There is, accordingly, the need for some sort of temperature compensation for the following:

(1) Variations of gage resistance which effect the bridge balance wherein the resistance of each element is equal.
(2) Variations of gage strain sensitivity or gage factor which effect the bridge output strain. The gage factor (GF) is equal to $$\frac{\frac{\Delta R}{R}}{\frac{\Delta R}{L}}$$

Bridge balance compensation

Semi-conductor strain gages possess two particular characteristics for strain gage applications. They have very large gage factors which is the change in resistance with applied strain and the gage factors may be positive (P) or negative (N) which is dependent upon the type of impurities or doping added to them during manufacturing. The resistance of a p-doped semi-conductor increases with applied tension whereas the resistance of an n-doped semi-conductor decreases. As shown in FIG. 3, by appjropriately connecting p- and n-doped semi-conductors into a bridge circuit and mounting all of the gages with a strain sensitive axis parallel to the primary strain vector developed in a stress member, a bridge output voltage will be attained which is:

$$E_{out} = \frac{E_{in}}{2} \cdot \frac{\Delta R_T}{R} = 2E_{in} \cdot \frac{\Delta R}{R}$$

$$R_3 = R_1 = R + \Delta R, \quad R_2 = R_4 = R - \Delta R$$

where $$\Delta R_T = \Delta R_1 - \Delta R_2 + \Delta R_3 - \Delta R_4 = 4\Delta R$$

If all bridge arms have equal resistance ($R$), $$\frac{\Delta R}{R} = GF \cdot \frac{\Delta L}{L}$$

where $GF$ = gage factor and $L$ = length.

Due to the identical mounting of all gages upon the stress member, the bridge output from such a configuration becomes $$E_{out} = 2E_{in} GF \cdot \frac{\Delta L}{L}$$

which is apjproximately four times the output of an electrically identical bridge with only one active gage.

While this gage and bridge configuration yields high outputs versus applied strain, it possesses a significant disadvantage with respect to temperature stability. Although both p- and n-type gages have positive-resistance temperature coefficients and therefore if selected for uniformity will not create temperature-induced bridge unbalance; temperature variations will cause dimensional changes to the stressed member which, in the example given is shaft 26. This cannot be distinguished from stress-induced strain and accordingly the bridge output can obtain both strain and temperature data.

For applications requiring better temperature stability, the configurations shown in FIG. 4 or FIG. 5 should be used. The circuit of FIG. 4 is arranged so that only 2 gages sense stress induced strain. p-Doped gages have positive resistive temperature coefficients and negative strain sensitive coefficient or gage factors, an increase in gage resistance caused by a temperature-induced strain and gage resistivity offsets the decrease in gage factor. When used in conjunction with a constant current power source. Balance compensation may be obtained by inactive gages which have resistive temperature coefficients greater than the active gages by the equivalent strain induced resistance caused by the difference in temperature coefficient of expansion between the silicon strain gages and the metal housing. Accordingly, the voltage output of FIG. 4 is less than that of FIG. 3 because only two gages are active and accordingly $\Delta R_T/R$ is one-half that of FIG. 3 for any given $\Delta L/L$.

FIG. 5 shows a configuration which provides higher bridge output for a given $\Delta L/L$ than FIG. 4 and also possesses good temperature stability. All gages are active, and accordingly contribute to the bridge output magnitude and all gages are p-doped types, hence have the same strain-type sensitive coefficient. The gages are mounted on a stress-sensitive member such as 26 with two gages aligned to the primary strain vector, which is longitudinal compression and the remaining two gages aligned to the secondary main vector which is transverse tension (due to Poisson's ratio). In other words, the two gages in compression would be aligned on surfaces 24 with the probe longitudinal axis while the tension gages would be perpendicular to the axis.

The longitudinal gages contribute $\Delta R/R = 2GF \cdot \Delta L/L$ and the traverse gages contribute $-\Delta R/R = 2GF \cdot 0.3 \Delta L/L$. The 0.3 factor arises due to Poisson's ratio for transverse strain developed in a longitudinally loaded uniform column. The 0.3 factor varies from one material to another but for the materials commonly used in gages, the figure 0.3 is close enough. The voltage output from FIG. 5 is $$E_{out} = \frac{E_{in}}{2} \cdot \Delta R_T/R .$$

where $\Delta R_T/R = 1.3$ times that of a single longitudinally positioned active gage.

The temperature stability of the configuration shown in FIG. 5 is inherently good because the gages all have the same positive resistive coefficient and since all the gages are active strain sensors, temperature-induced strains will be sensed equally in each bridged arm. It may be noted that dimensional changes caused by temperature are volumetric changes and therefore Poisson's ratio does not apply to temperature induced $\Delta R_T/R$. The bridge balance error will be small because the net increments of resistance change that are applied to the arms of the bridge will be of the same polarity and magnitude. And if the gages are of perfectly matched:

$$(\Delta R_T)_{temp} = +(+\Delta R_1) - (+\Delta R_2) + (+\Delta R_3) - (+\Delta R_4) = 0$$

*Gage factor compensation*

The strain gages used in this transducer increase in resistance with an increase in resistivity and the difference in temperature coefficient of expansion for p-gages on high expansion (greater than $1.4 \times 10^{-6}$ in./in.) materials. Conversely, the strain sensitivity or gage factor decreases. This combination of characteristics is employed to obtain a uniform bridge output versus $\Delta L/L$ over the range of temperatures encountered in operational use.

Examination of the bridge output voltage $$E_{out} = \frac{E_{in}}{2} \cdot \Delta R_T/R$$

reveals that $E_{out}$ is a direct function of the bridge excitation voltage or input voltage as well as $\Delta R_T/R$.

Considering that $\Delta R_T/R$ is a direct function of gage factor, it becomes apparent that decreases in transducer sensitivity caused by reduced gage factors can be offset by properly proportioned increases in bridge excitation voltage. By supplying a bridge excitation voltage from a constant current source (referred to in the description of FIG. 2), increases in bridge excitation voltages can be obtained with increases in temperature due to the fact that the increasing resistance of the bridge elements causes the power supply to increase the voltage across the bridge to maintain a constant current. If the percent increase of resistance is greater than the percent decrease in sensitivity per ° F., an apparent increasing sensitivity is obtained. Accordingly, by using a properly proportioned resistor across the input terminals or power supply, the slope of the increasing sensitivity versus temperature curve may be reduced to zero over a finite temperature range, thus providing a substantially constant sensitivity sensor bridge. This resistor is termed a slope-bias resistor.

Thus it can be seen that the desirable characteristics of semi-conductor or piezo-resistive elements can be utilized in a small transducer assembly to obtain accurate pressure readings in such applications as rocket engines. Not only is the gage factor large for semi-conductor elements as compared with wire strain gages and piezo-electric elements, but the use of a large diameter probe end as compared with the strain gage location on the shaft provides for an inherent multiplication of the strain factor. Also, the temperature problems commonly associated with semi-conductor elements are compensated for by a constant current source in conjunction with the slope bias resistor on the input voltage. Finally, the arrangement of the semi-conductor elements as shown in FIGS. 3–5 provides an arrangement for use in varying conditions. Also, it is within the scope of this invention to contour the shaft 26 so as to be usable in configurations wherein the wall 4 is at angles or curvatures other than 90 degrees from the probe axis.

It is to be understood that the forms of the invention herein shown and described are to be taken as preferred embodiments of the same and that the various changes in the shape, size and arrangement of parts may be resorted to without departing from the spirit of the invention or the scope of the claims appended hereto.

We claim:
1. A unitary elongated transducer insertable in the wall of a chamber for measuring the pressure of fluid in the chamber comprising:
   an elongated probe having an intermediate section with a cross-sectional area smaller than that of each end section,
   a non-metallic erodable tip connected to one said probe end section, said tip adapted to be exposed to fluid in a chamber,
   means adjacent to said tip adapted to seal said intermediate section from said fluid pressure,
   an electrical connector attached to the other said probe end section, said electrical connector, tip, and probe having a common longitudinal axis,
   a plurality of semiconductor strain gages disposed on said probe intermediate section, said strain gages having electrical leads passing through said electrical connector,
   a Wheatstone bridge having voltage read out means, at least two of said strain gages being disposed in its arms,
   means for supplying constant current through said electrical connector to said strain gages, and
   means on said probe between said connector and said probe intermediate section for mounting the transducer in a port formed in the wall of the chamber, whereby fluid pressure exerted against said tip causes compressive strain in said strain gages and a voltage read out on said Wheatstone bridge to determine the fluid pressure.

2. The transducer according to claim 1 wherein said strain gages are constructed of p-doped semiconductor material and a slope-bias resistor is connected across the terminals of the Wheatstone bridge.

References Cited by the Examiner

UNITED STATES PATENTS

| 2,327,935 | 8/1943 | Simmons | 73—398 X |
| 2,472,045 | 5/1949 | Gibbons | 73—398 |
| 2,867,707 | 1/1959 | MacDonald | 73—398 X |
| 3,149,488 | 9/1964 | Castro | 73—398 |

OTHER REFERENCES

Sanchez et al., Recent Developments in Flexible Silicon Strain Gages. Instrument Society of America Paper 37-SL61. January 1961. Pages 323–333 relied on.

LOUIS R. PRINCE, *Primary Examiner.*

DAVID SCHONBERG, *Examiner.*

D. O. WOODIEL, *Assistant Examiner.*